United States Patent [19]

Rudak

[11] Patent Number: 4,974,260

[45] Date of Patent: Nov. 27, 1990

[54] APPARATUS FOR IDENTIFYING AND CORRECTING UNRECOGNIZABLE CHARACTERS IN OPTICAL CHARACTER RECOGNITION MACHINES

[75] Inventor: Peter Rudak, Hilton, N.Y.

[73] Assignee: Eastman Kodak Company, Rochester, N.Y.

[21] Appl. No.: 360,565

[22] Filed: Jun. 2, 1989

[51] Int. Cl.$^5$ ............................................. G06K 9/72
[52] U.S. Cl. ........................................ 382/57; 382/56
[58] Field of Search ............... 382/62, 65, 30, 56, 382/57, 67, 61, 40, 7, 33, 32; 358/263, 452, 453

[56] References Cited

U.S. PATENT DOCUMENTS

| | | | |
|---|---|---|---|
| 3,832,682 | 8/1974 | Brok et al. | 382/57 |
| 3,848,228 | 11/1974 | MacNeill | 382/57 |
| 4,068,212 | 1/1978 | Templeton | 382/57 |
| 4,403,340 | 9/1986 | Kumpf et al. | 382/62 |
| 4,488,130 | 12/1984 | Rainowitz | 358/181 |
| 4,491,965 | 1/1985 | Yoshimura | 382/57 |
| 4,530,000 | 7/1985 | Mizokawa | 358/183 |
| 4,564,752 | 1/1986 | Lepic et al. | 382/57 |
| 4,633,297 | 12/1986 | Skerlos et al. | 358/183 |
| 4,644,401 | 2/1987 | Gaskins | 358/22 |
| 4,674,065 | 6/1987 | Lange et al. | 382/57 |
| 4,739,406 | 4/1988 | Morton et al. | 358/22 |
| 4,747,058 | 5/1988 | Ho | 382/57 |
| 4,768,083 | 8/1988 | Romesburg | 358/22 |
| 4,774,582 | 9/1988 | Hakamada et al. | 358/22 |
| 4,777,531 | 10/1988 | Hakamada et al. | 358/22 |
| 4,914,709 | 4/1990 | Rudak | 382/57 |

OTHER PUBLICATIONS

"Penny Pitching Lans", Mar., 1989, pp. 255-258, Robert W. Kane and Tami Peterson.

Primary Examiner—Leo H. Boudreau
Attorney, Agent, or Firm—Dennis R. Arndt

[57] ABSTRACT

An apparatus for identifying a character which cannot be machine read so that the operator may observe and hopefully recognize the character in question. A bit-map video image of the unrecognized character(s) is inserted in the ASCII data line of neighboring characters to create an impression of the original line of text from the document. A data entry operator uses this information to enter the required correct character(s) via the keyboard or other means. This reject/reentry method allows for quick operator response, and minimizes data storage and transmission of video information.

13 Claims, 8 Drawing Sheets

← ASCII DATA LINE

FIG. 1
"PRIOR ART"

← ASCII DATA LINE

JANE

APPARATUS FOR IDENTIFYING AND CORRECTING UNRECOGNIZABLE CHARACTERS IN OPTICAL CHARACTER RECOGNITION MACHINES

CROSS REFERENCE TO RELATED APPLICATIONS

Reference is made herein to commonly assigned, copending U.S. patent application Ser. No. 360,967, entitled METHOD FOR IDENTIFYING UNRECOGNIZABLE CHARACTERS IN OPTICAL CHARACTER RECOGNITION MACHINES, in the name of P. Rudak, filed concurrently herewith, now U.S. Pat. No. 4,914,709.

TECHNICAL FIELD

The invention relates generally to systems for reading characters, and more particularly to character reading systems wherein operators are employed to assist in identifying characters which cannot be machine read and for making the necessary corrections.

BACKGROUND ART

Optical Character Recognition (OCR) offers excellent productivity gains over manual data entry. No OCR algorithm can identify 100% of all characters ever presented. There will always be those characters deemed "unrecognizable" or "uncertain". How we deal with these recognition uncertainties which are referred to as reject/reentry depends on the particular application. In general, one of two approaches is used: (1) the OCR algorithm makes its best guess on all characters and any corrections or edits are made by proofreading or using electronic spell-checking, or (2) the OCR algorithm flags those characters deemed uncertain and a human operator corrects those errors based on the original document or an image of that document.

The first approach works quite well for letters, memos, or other documents with contextual information (i.e., words with known spelling). However, most documents encountered in the business world are forms. These can be claims forms, remittance documents, bills, order forms, checks, etc. Unfortunately, these documents offer very little contextual information, since the pertinent information consists of proper names, addresses, dollar amounts, insurance numbers, or account numbers. Therefore, the second approach of reject/reentry is more appropriate for these applications.

Once the OCR algorithm is instructed to flag all uncertain characters, a reject/reentry system is required, where an operator can correct and/or confirm the uncertain characters. Currently, there are three ways of accomplishing this: (1) Go back to the original paper document, (2) use a microfilm image of the document as a reference, or (3) use an electronic image as a reference. Of these choices, (1) is the easiest to implement (but also the most labor intensive), (3) is the most difficult to implement (but requires the least amount of labor) and (2) is somewhere in between. Most of today's state-of-the-art OCR systems use electronic imaging for reject/reentry.

Figure 1:
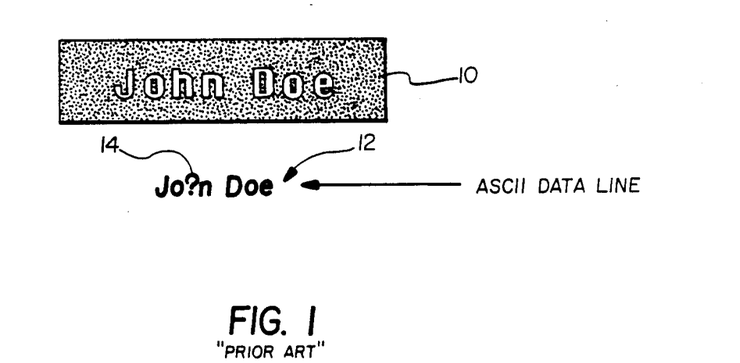
FIG. 1 is a diagrammatic view showing a video display window used in the prior art to display data and correct unrecognizable characters.

Although electronic imaging offers the highest Productivity for reject/reentry, how the system is implemented plays a major role in operator efficiency, data integrity, and the resulting productivity gain. The most popular method of displaying the reject/reentry information on a computer screen consists of a video window 10 to display the image of the uncertain character(s) and a line of ASCII data 12 to display the OCR results as shown in FIG. 1. The operator looks at the ASCII data and finds the uncertain character usually highlighted or replaced by a "?" 14, and then looks up at the video window 10 for that field, and finds the corresponding character. The operator then types the correct character using the keyboard. Usually the entire field (such as the name field) is displayed in the video field in order to give the operator some context (for example, deciding between a "0" or an "o" may depend on whether that character's neighbors were letters or numbers). However, looking back and forth between the video window 10 and the ASCII data 12 (FIG. 1) is time consuming and can cause operator fatigue. Also, displaying an entire field of video for each uncertain character slows down screen updates because of the additional information that must be written on the screen. This also means increased data, requiring increased disk storage, as well as longer data transmission times, thereby adding further inefficiencies. One way to minimize operator fatigue is to speed up the correction process so as to reduce the amount of data required for the Video Display Window. This may be accomplished by using an "Embedded Video Window", that carries a bit map image of the unrecognizable character.

DISCLOSURE OF THE INVENTION

It is therefore an object of the present invention to provide an improved character reading system wherein the character which could not be read by the machine, allows the operator to view the character in question in use context (its surrounding characters) to aid in the proper identification of the character. The video image of the uncertain character is used to replace the uncertain character within the ASCII data string.

It is another object of the present invention to reduce by a factor of ten or more the amount of stored video data in association with reject/reentry techniques of the past.

It is still another object to increase operator efficiency, reduce data, and result in faster screen updates whereby operator productivity is increased greatly.

Yet another object is to display via masking only the character of interest without bits and pieces of neighboring characters within a document.

BRIEF DESCRIPTION OF THE DRAWINGS

Other objects, advantages and features of this invention will become more fully apparent from the following detailed description, appended claims, and accompanying drawings:

MODES OF CARRYING OUT THE INVENTION

Figure 2:
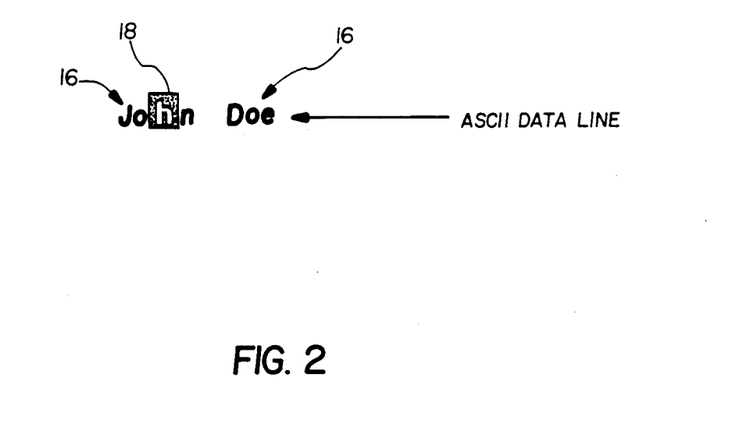
FIG. 2 is a diagrammatic view showing a video display window depicting the unrecognizable characters in accordance with the present invention.

Referring to FIG. 2, it can be seen that the present invention displays the ASCII data 16 for all the identified characters. However, instead of displaying the video window 10 of the entire field as was shown in the past (FIG. 1), only the bit map video image 18 of the uncertain character replaces the uncertain character in the ASCII data string 16. By extracting and displaying only the character of interest, it allows the operator to recognize the character in question by using context (surrounding characters).

This type of reject/reentry is especially applicable for documents containing only machine generated types (typewriter, dot matrix printer, laser printer, typeset, etc.). Although slight variations may be noticeable between different fonts, the operator will not normally be able to distinguish font differences based on a single character. Accordingly, the ASCII data string 16 is displayed in a fixed font and the embedded bit map video image 18 will contain a character of a different front and no discontinuity should be noticeable.

A problem that had to be overcome in practicing the present invention was in extracting and displaying only the character of interest without portions of neighboring characters from the document which may make it more difficult for the operator to identify the unrecognizable character.

Figure 3:
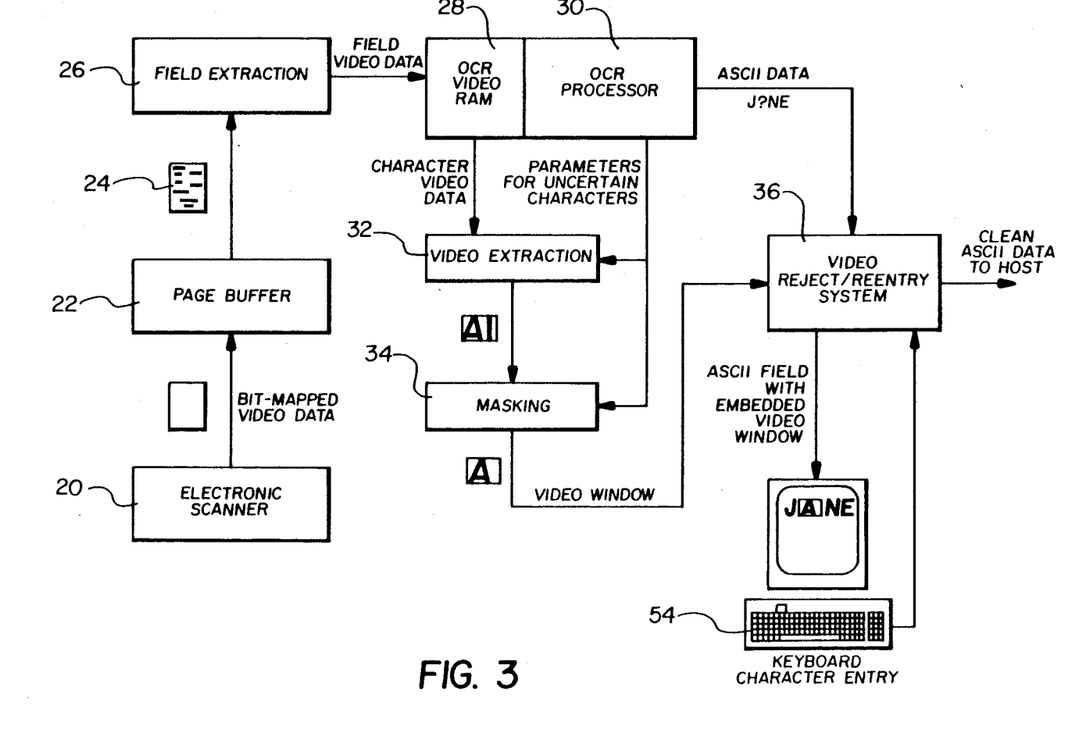
FIG. 3 is a block diagram of an OCR system in accordance with the present invention.

Referring to FIG. 3, it can be seen that the system includes an electronic scanner 20 and page buffer 22, a field extraction subsystem 26, OCR Processor and Video RAM 30 and 28, respectively, video extraction 32 and masking subsystems 34, the items 30, 32 and 34 interfaced with the reject/reentry system 36.

Electronic scanner 20 is adjacent to a document transport system (not shown) that moves documents past scanner 20 at a controlled rate allowing each document to be scanned serially and the bit mapped images of the documents are stored sequentially in page buffer 22. The electronic image of the document contains a binary representation of the original document, where a binary "1" signifies character information (black) and a binary "0" signifies background information (white). While one page is being stored in page buffer 22, the previous page is being extracted from page buffer 22 and sent on to field extractor 26. A computer controller (not shown) instructs field extraction subsystem 26 to extract pertinent fields of interest 24 off the document. There could be anywhere from one to hundreds of fields of interest on a document. One entire document could be said to be a single field; however, the more information extracted the more time it will take to process or read the information. If large amounts of information approaching the major portion of a document were to be read, it may be necessary to stop further documents from being placed on the document transport until the field extraction process has been completed on previous scanned documents. This extracted data is sent to OCR video RAM 28 which is part of the OCR processor 30.

OCR processor 30 processes the field video information stored in OCR video RAM 28. It identifies character locations, and interprets the bit-mapped information to produce an ASCII representation for each character. Each interpreted character carries a certain level of confidence. If that level of confidence for a particular character is higher than a preprogrammed threshold, the ASCII code for that character is transmitted directly to the reject/reentry system 36. If a character cannot be interpreted with an acceptable degree of confidence, OCR processor 30 transmits a question mark (or other marker) instead of the actual ASCII interpretation, thereby identifying the presence and location of the "unrecognizable character".

Figure 4A:
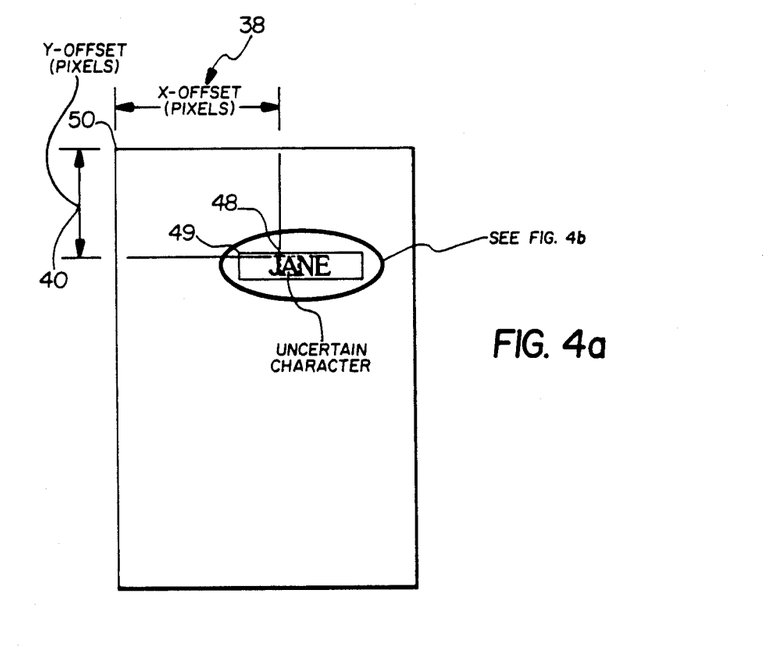
FIG. 4a is a diagrammatic view of the video display.
Figure 4B:
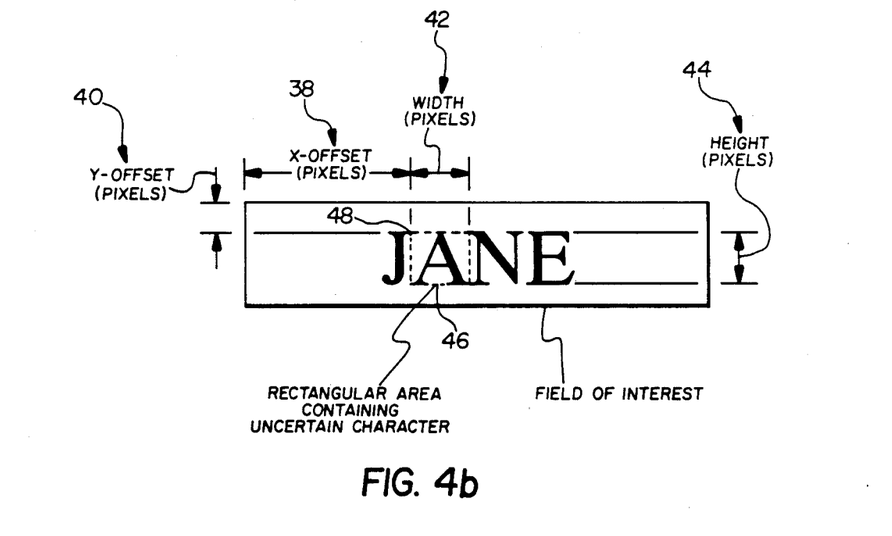
FIG. 4b illustrates an enlarged portion of FIG. 4a parameters to extract the video information from the OCR video RAM shown in FIG. 3.

In addition to identifying uncertain characters with a question mark, OCR processor 30 also saves the location parameters for that character: X offset 38, Y offset 40, width 42 and height 44, as illustrated in FIG. 4. Video extraction 32 functions to define the location of a character by identifying the size and position of the smallest rectangular area 46 which is capable of completely surrounding the unrecognizable character. The width 42 and height 44 of this rectangle 46 define the size of the unrecognizable character, while the X-offset 38 and Y-offset 40 define its position. X-offset 38 measures the horizontal (cross-scan) distance between the upper lefthand corner 48 of the defining character rectangle 46 and a reference point such as the upper lefthand corner 49 of the field or the upper lefthand corner 50 of the original document depending on the application. Y-offset 40 measures the corresponding vertical (line count) distance. All of these parameters are measured in pixels (picture elements, also referred to as PELS), each pixel representing the smallest area or linear distance resolvable by electronic scanner 20. In the present embodiment, there are 200 pixels per inch in both the horizontal and vertical directions.

OCR processor 30 passes the location parameters to video extraction 32 which uses these Parameters to extract the bit mapped video image of the unrecognizable characters from OCR video RAM 28. Although the location parameters can pinpoint the rectangular area surrounding the unrecognizable character to within a pixel, video extraction 32 must read the information on byte boundaries (8 pixels per byte) in order to accommodate the physical configuration of the memory and its associated data bus. Accordingly, the byte boundaries are selected so as to guarantee that the resulting bit map video image (see FIG. 5) includes the entire unrecognizable character. However, in order to insure that the entire unrecognizable character has been extracted, the resulting bit map video image 18 may extend beyond the actual unrecognizable character boundaries such that portions of the neighboring characters may be included in the bit map video image as well, as illustrated in FIG. 5.

The byte format is applied in the horizontal direction—8 consecutive pixels in the horizontal direction form a byte. In the vertical direction, the video information may be accessed on a line boundary, where 1 line is equivalent to the height of 1 pixel. Accordingly, the video extraction process must round both the X-offset 38 and width 42 parameters to the nearest byte. The X-offset 38 is rounded to the smallest multiple of 8 pixels (byte boundary), and the difference between the actual X-offset 38 and the resulting byte boundary X-offset is stored as a remainder. Next, the remainder is added to the width 42 parameter and the result is rounded up to the next largest multiple of 8 pixels to obtain the byte-boundary width 56. Such a procedure insures that the resulting rectangle does not truncate any portion of the unrecognizable character.

Next, by way of example, we will consider a set of actual location parameters for an uncertain character with X-offset=34, and width=16. First, the X-offset would be rounded to 32 (the next smallest byte boundary) and the difference of 34−32 =2 would be stored as a remainder. This remainder of 2 would then be added to the width 16+2=18 and this result would be rounded up to the next highest byte boundary (24). The Y-offset 40 and height 44 remain on pixel boundaries.

Figure 5:
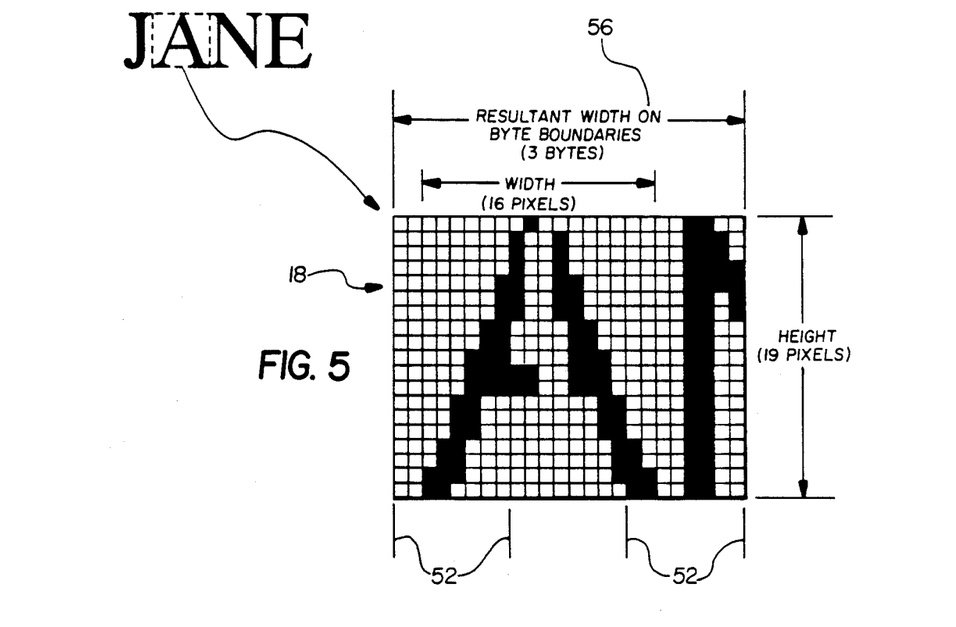
FIGS. 5-8 illustrate in steps how masking eliminates extraneous information from the left-most and right-most bytes.

Because rounding to the next higher byte boundaries 52 may result in the video extraction process reading and displaying additional information to either the right or the left of the targeted character, parts of neighboring characters, such as the neighboring character "N", may be present in the video image shown in FIG. 5. The presence of extraneous marks (such as portions of neighboring characters) within the bit mapped video image 18 containing the character may hinder an operator's ability to recognize the uncertain character in the bit mapped video image 18. In order to remove this information, yet maintain data transfers on byte boundaries, a masking process is employed. Because rounding to byte boundaries is only done in the horizontal direction, only the left-most and right-most pixels are affected, and as a result, are the only pixels that need be "masked". The video bit-mapped image is comprised of binary pixels (black=1, white=0). Therefore, in order to mask out a pixel, a binary 0 (white) must replace the existing (black) pixels in the mask area.

Figure 6:
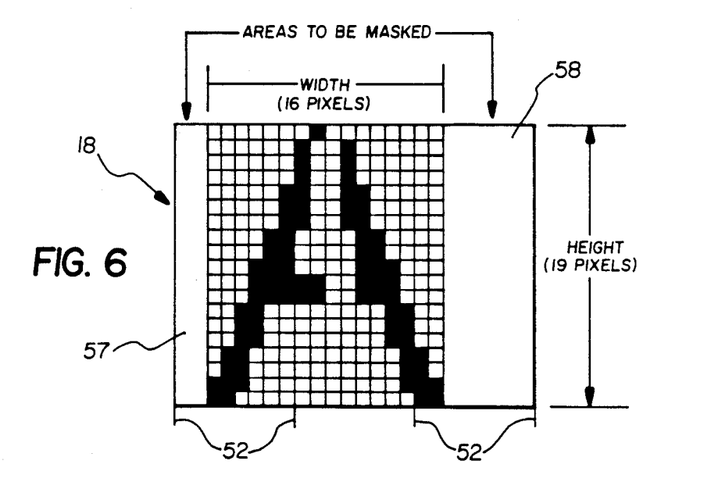

The left-most pixels to be masked are determined by the "remainder" when rounding X-offset 38 to the nearest byte. As in the previous example, where X-offset 38 originally was 34 and the nearest byte boundary was 32, the remainder was 2. Accordingly, the first two pixels 57 of all left-most bytes would require masking as illustrated in FIG. 6.

The right-most pixels to be masked are determined by subtracting the original width and the "remainder" from the byte boundary width. Turning once again to the previous example, this would be 24 −16−2=6. In this case, the last 6 pixels 58 of all right-most bytes would require masking as illustrated in FIG. 6.

The masking process itself is a logic "AND" function. A "mask byte" exists where pixel locations requiring masking contain a logic "0" and all other pixel locations contain a logic "1". Referring to the example, the left-most bytes require masking for the first 2 pixels 57. The resulting left "mask byte" would be 0011 1111 (3F Hex, or 63 Decimal). The right-most bytes require masking for the last 6 pixels 58. The resulting right "mask byte" 59 would be 1100 0000 (C0 Hex, or 192 Decimal). An "AND" operation is performed between the mask byte 59 and the video data 61 to form a masked video byte 63. In this way, the unwanted left-most and right-most pixels are guaranteed to be white which is much less objectionable than having parts of neighboring characters.

Figure 7:
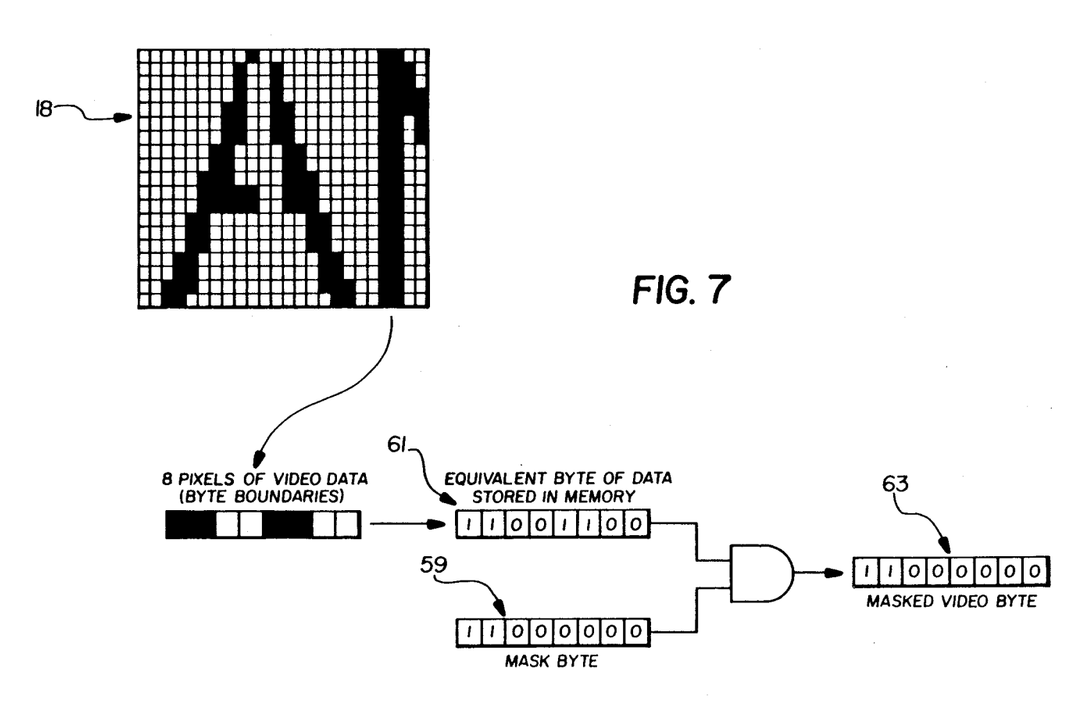

FIG. 7 shows the last video byte 61 1100 1100 (a right-most byte) being ANDed with the right-most masking byte 59 1100 0000 to form masked video byte 63 1100 0000. It should be noted that the original video data contained some black (logic "1") information from a neighboring character "N". Thus, it can be seen that the masking process erased or removed this unwanted information by replacing these pixels with logic "0" (white).

Figure 8:
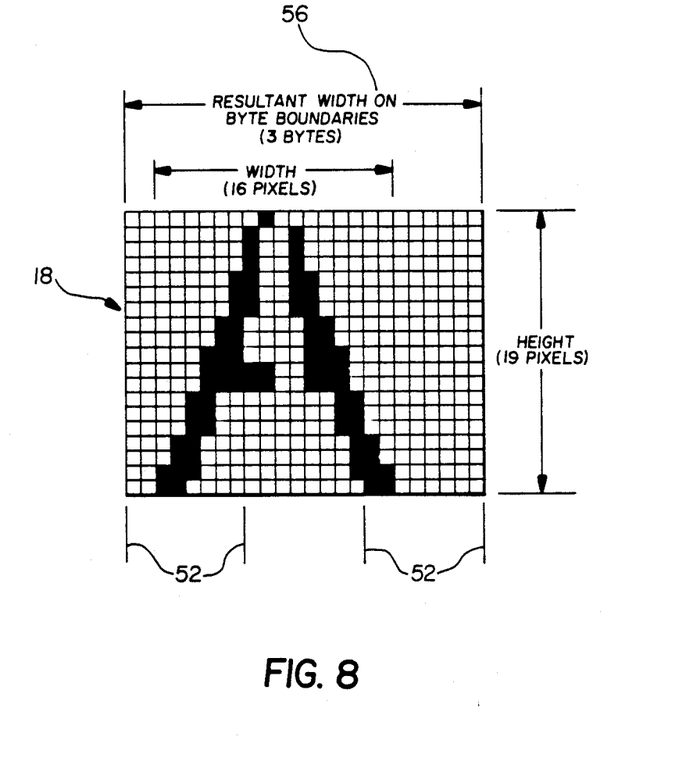

FIG. 8 illustrates the final character video image after the masking process. Video image 18 remains on byte boundaries but the neighboring character information has been "whited out" by the masking process. It is this final video image (FIG. 8) that will be used during the reject/reentry process.

On completion of the masking function, the bit map video image containing the uncertain or unrecognizable character is passed to the reject/reentry system 36 to be combined with the ASCII information found in that field. The video reject/reentry system 36 displays the bit map video image in place of the uncertain character (FIG. 2) along with the string of ASCII characters displayed on the screen. In effect, displacing the location where the character would reside had it been recognized successfully. In this way, it allows the operator to view the bit map video image within the context of its field, allowing the operator to type the correct character via the keyboard 54. Upon typing the correct character via keyboard 54, an ASCII representation of the now corrected character replaces the bit map video image, so that all the characters in the data line are now ASCII characters. This reject/reentry process continues in a similar fashion for all uncertain or unrecognizable characters found as a result of the OCR process. The screen is updated with new ASCII data lines from other fields 24 with bit map video images embedded in the string of ASCII characters in place of the unrecognizable character allowing the operator to quickly and accurately insert via the keyboard 54 the correct character.

Flow Chart Video Extraction and Masking Functions

Figure 9:
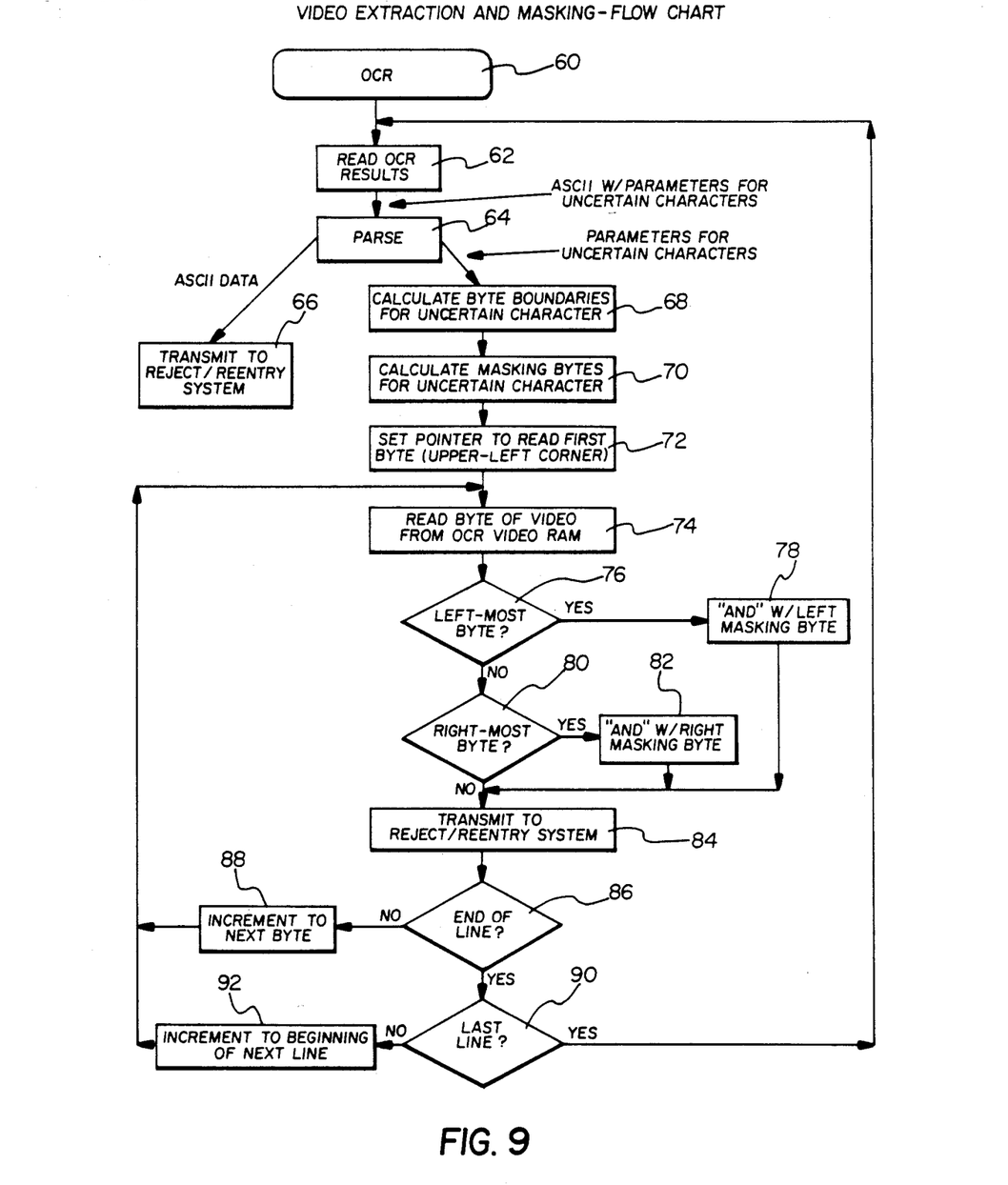
FIG. 9 shows the flow chart for the video extraction and masking functions of the present invention.

FIG. 9 shows a flow chart for the video extraction and masking subsystems. Optical Character Recognition 30 generates information in step 60 such as the character that is recognizes from fields 24 of the document as well as the parameters for the uncertain or unrecognizable characters. In step 62, the OCR information is read and sent to the parser in step 64. The parser looks at the data produced by OCR 30 in step 60 and separates the successfully read ASCII data from the uncertain character information by searching for the combination of "?" followed by a control character (the non-printable control character is used with the Printable "?" in case the "?" was actual data read from the document). Each incoming byte is analyzed in sequence. All successfully recognized ASCII information is sent directly to reject/reentry 36 in accordance with step 66. However, if a control character is encountered by the parser in step 66, it knows that the next 16 bytes contain the location parameters (X-offset 38, Y-offset 40, width 42 and height 44 with 4 bytes in each) for the unrecognizable character.

These location parameters are used to calculate byte boundaries for uncertain characters in step 68. Because the location parameters locate a character using pixel boundaries, but the video RAM 28 requires data to be read on a byte basis. This configuration requires that the nearest byte boundaries are calculated to encompass the entire character (with possible extraneous markings being included due to rounding). To eliminate the extraneous information, step 70 calculates mask bytes for the left-most and right-most bytes. Actually, it is the unwanted portion of the bytes that had to be included to insure that the entire uncertain character was encompassed.

Once the above calculations are completed, step 72 provides for a pointer to be set up to read the first byte of video (upper left-hand corner 50 in FIG. 4) where the reading process begins. In step 74, a byte of video is read from the OCR Video RAM 28 (FIG. 3) with the pointer being initially set for the upper left-hand corner. If a particular byte is determined to be a "left most" byte (the first byte read from the OCR RAM is always the left-most byte), a decision is made in step 78 to "AND" this byte with the left masking byte (calculated earlier) in accordance with instructions in step 78. If in step 76 it is found not to be the left-most byte, it is then checked for being a right-most byte in step 80 in which case the byte is "ANDed" with the right masking byte in accordance with step 82. If the byte is located in the center of the line, the video is passed with no masking. In all instances, no matter what path was taken, the video is sequentially transmitted from left to right to the reject/reentry system as per step 84. As each byte is passed, a determination is made in step 86 as whether or not it is the end of line, if not the pointer is incremented to the next byte in step 88. This is done until the end of line is reached and we move to step 90 where it is determined when an end of line is encountered. If it is not the last line, the pointer is updated to begin the next line in step 92 and the process continues left to right on the next line. Lines of video are processed this way until the last line has been completed, step 90. At this point, the additional OCR results are ready to be processed.

Reject/Reentry Flow Chart

Figure 10:
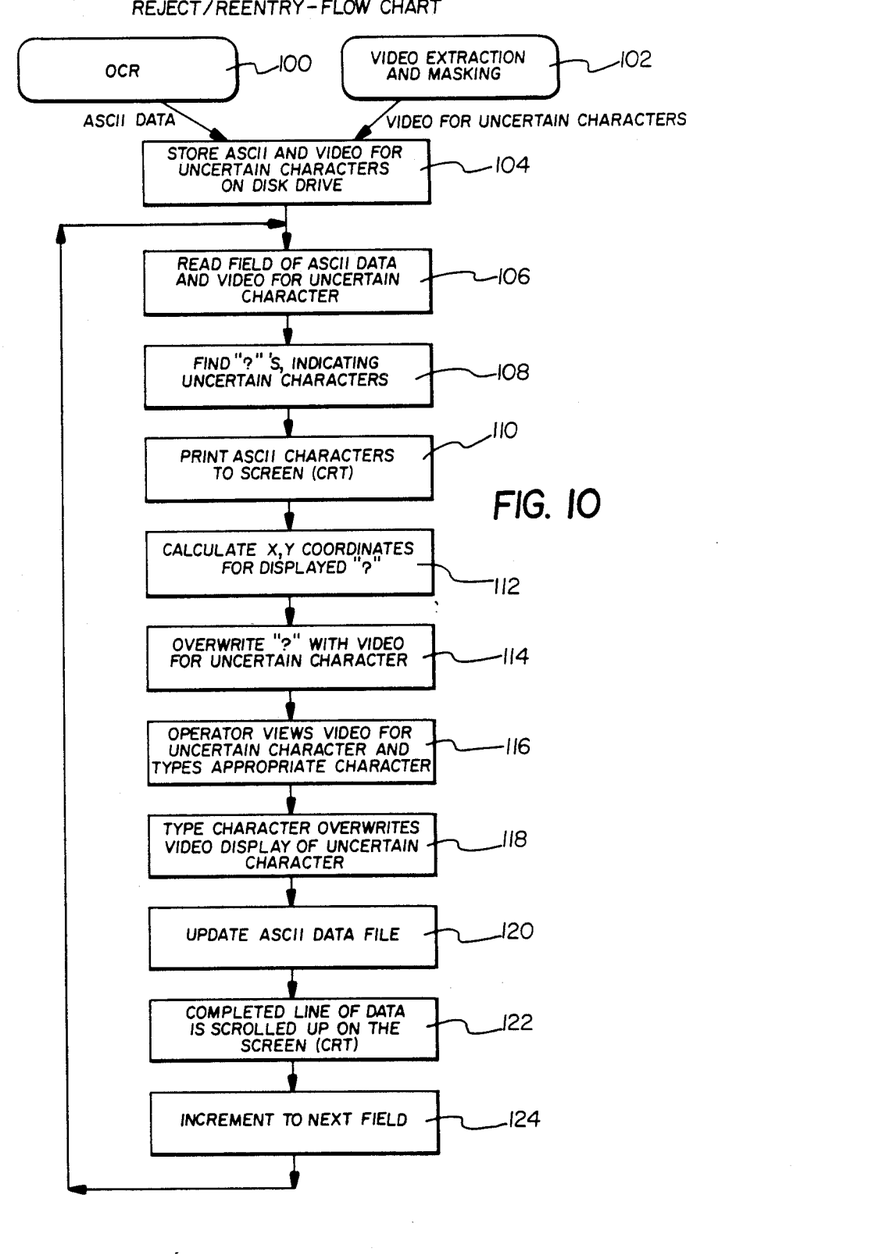
FIG. 10 shows the flow chart for the reject/reentry function of the present invention.

FIG. 10 shows a flow chart for the Reject/Reentry System. ASCII data is received from the OCR processor in box 100. Video information is also received from the Video Extraction and Masking Subsystems in box 102. This received information is stored on a disk drive or other storage media as set forth in step 104. In this way, the reject/reentry process does not have to occur simultaneously with data capture. The information is stored on a disk until an operator is ready to perform the reject/reentry process When the reject/reentry process is begun, a field containing an uncertain character is read from disk storage in step 106. The retrieved information includes all successfully recognized characters in ASCII form and a bit mapped video image is inserted for the uncertain character(s). In step 108, the "?" or other marker within the ASCII data string is located within the particular field. The ASCII characters are displayed on the screen in step 110. In step 112, the X and Y coordinates for the location of the "?" are calculated. These calculations are used to overwrite the "?" with the bit mapped video image in step 114.

In step 116, the operator views the bit mapped video image depicting the uncertain character along with the neighboring textual ASCII character string and types the correct character via a keyboard. The character typed by the operator replaces the bit mapped video image as per step 118. Step 120 causes the ASCII file to be updated with the correct data replacing the former unrecognized character. Step 122 results in the completed line of data being scrolled up on the screen of the workstation and, in accordance with step 124, the next field containing an uncertain or unrecognized character is brought into position for consideration.

Advantages and Industrial Applicability

The present invention is useful in an image management system and more particularly in systems that use optical character recognition (OCR) to enter retrieval information automatically as opposed to manual data entry, which is more labor intensive. The use of an imbedded bit mapped video image to replace the unrecognized character in a string of ASCII characters that were successfully identified minimizes both data storage and transmission requirements, while maximizing screen update speed. Such a system results in a lower cost, higher efficiency reject/reentry system.

What is claimed is:

1. A document handling system for processing documents having characters printed thereon comprising:
   transport means for serially transporting said documents through said system;
   scanning means located adjacent said transport means for scanning each document line by line as it moves through said system and reading those characters printed thereon;
   means responsive to said scanning means and means for generating a signal when encountering an unrecognizable character;
   display means for displaying from the document a line segment of correctly read characters in ASCII format on either side of the unrecognizable character;
   video extraction means for extracting a bit map image of the unrecognizable characters and displaying said image between said displayed line segment; and
   data entry means for allowing an operator to enter the correct ASCII character into said scanned data after appropriately identifying said unrecognizable character.

2. Character recognition apparatus comprising:
   character recognition means for scanning a document and producing a code for recognized characters and bit map data for unrecognized characters;
   memory means connected to the character recognition means for storing the code representing recognized characters;
   display means connected to the character recognition means and memory means responsive to code from said memory and bit map data from the character recognition means for displaying a line of recognized characters including a bit map of an unrecognized character and;
   operator entry means connected to said memory means for entering operator recognized character codes into said memory to generate an operator recognized character on said display means in place of said bit map data.

3. A document handling system for processing documents having characters encoded thereon comprising:
   scanning means for scanning each document line by line and pixel by pixel;
   field extraction means for reading certain predetermined fields on said document;
   storage means for storing said scanned data;
   optical character processing means for converting said scanned data in said fields into lines of readable characters and identifying the position of said unrecognizable characters within the line;
   video extraction means responsive to said optical character processing means so that when an unrecognizable character is detected said extraction means retrieves from said storage means a bit mapped image of said unrecognizable character;
   video reentry means for displaying said line of readable characters along with the bit mapped image of said unrecognizable characters properly positioned in said line; and means for entering the correct character into said storage means after viewing.

4. The document handling system set forth in claim 3 wherein said video extraction means also receives the coordinates of said unrecognizable character on said document.

5. The document handling system set forth in claim 4 wherein said video extraction means further includes masking means for masking out any marks in the bit mapped image not associated with said unrecognizable character.

6. The document handling system set forth in claim 4 wherein said video reentry means further includes storage means for storing the line of readable characters and the bit mapped image of said unrecognizable characters positioned in said line for correction at a later date.

7. The document handling system set forth in claim 4 wherein said video reentry means displays said readable characters in ASCII format.

8. The document handling system set forth in claim 3 wherein said field extraction means further includes microcomputer means which identifies the location of specific fields for reading.

9. The document handling system set forth in claim 5 wherein said masking means effects only the left-most and right-most groups of pixels in the bit mapped image.

10. The document handling system set forth in claim 4 wherein the coordinates include the X-offset and Y-offset on the document of said unrecognizable character and the height and width of the smallest rectangle surrounding the unrecognizable character.

11. The document handling system set forth in claim 10 wherein the X-offset would be rounded to the next smallest byte boundary and the magnitude of the byte boundary would be subtracted from the X-offset and the result being stored as a remainder.

12. The document handling system set forth in claim 11 wherein the remainder would be added to the width and the result rounded up to the next higher byte boundary to obtain the byte-boundary width.

13. The document handling system set forth in claim 12 wherein the Y-offset and height remain on pixel boundaries.

* * * * *